(12) United States Patent
Sethi et al.

(10) Patent No.: US 12,323,294 B2
(45) Date of Patent: Jun. 3, 2025

(54) METHOD TO AUTO CORRECT THE DEFAULT RESOURCE ALLOCATION OF SERVICES IN A MIGRATION ENVIRONMENT

(71) Applicant: Dell Products L.P., Round Rock, TX (US)

(72) Inventors: Parminder Singh Sethi, Ludhiana (IN); Lakshmi Saroja Nalam, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/181,682

(22) Filed: Mar. 10, 2023

(65) Prior Publication Data
US 2024/0305523 A1    Sep. 12, 2024

(51) Int. Cl.
*H04L 41/0806* (2022.01)
*H04L 41/16* (2022.01)

(52) U.S. Cl.
CPC .......... *H04L 41/0806* (2013.01); *H04L 41/16* (2013.01)

(58) Field of Classification Search
CPC ............................ H04L 41/0806; H04L 41/16
See application file for complete search history.

(56) References Cited

U.S. PATENT DOCUMENTS

| | | | |
|---|---|---|---|
| 6,229,538 B1 | 5/2001 | Mcintyre et al. | |
| 6,671,802 B1 | 12/2003 | Ott | |
| 6,757,838 B1 | 6/2004 | Chaiken | |
| 7,590,981 B2 | 9/2009 | Gupta et al. | |
| 8,078,448 B1 | 12/2011 | Wohlberg et al. | |
| 8,090,819 B1 | 1/2012 | Ramamurthy | |
| 9,086,941 B1 | 7/2015 | Siegel | |
| 9,444,717 B1 | 9/2016 | Aithal | |
| 11,128,701 B1 * | 9/2021 | Virtuoso | G06F 9/5083 |
| 2006/0026415 A1 | 2/2006 | Chen | |
| 2006/0029097 A1 | 2/2006 | Mcgee et al. | |
| 2008/0148031 A1 | 6/2008 | Brown | |
| 2008/0215910 A1 | 9/2008 | Gabriel | |
| 2009/0103430 A1 | 4/2009 | Wang | |
| 2011/0035498 A1 | 2/2011 | Shah et al. | |
| 2011/0113224 A1 | 5/2011 | Isshiki et al. | |
| 2011/0225274 A1 | 9/2011 | Dvorkin | |

(Continued)

*Primary Examiner* — John A Follansbee
*Assistant Examiner* — Zonghua Du
(74) *Attorney, Agent, or Firm* — Chamberlain, Hrdlicka, White, Williams & Aughtry; Aly Z. Dossa

(57) ABSTRACT

In accordance with one or more embodiments of the invention, a method is provided for configuring resources in a cloud environment. A request is received from a user requesting that a migration of one or more services to a cloud environment begin. Once the request is received, the method determines a default resource provisioning of the cloud environment. The one or more services are analyzed to determine their current resource usage and based on their current usage, the method forecasts future resourced requirements of the one or more services. The method then compares the forecasted future resource requirements with that of the default resource provisioning of the cloud environment, and when the comparison is greater than a predetermined threshold a new level of resource provisioning is recommended.

15 Claims, 4 Drawing Sheets

(56) References Cited

U.S. PATENT DOCUMENTS

| | | | |
|---|---|---|---|
| 2012/0324469 A1* | 12/2012 | Nishihara | G06F 9/50 718/104 |
| 2015/0081829 A1 | 3/2015 | Maity | |
| 2015/0169291 A1* | 6/2015 | Dube | G06F 8/61 717/101 |
| 2015/0278219 A1 | 10/2015 | Phipps | |
| 2016/0011880 A1 | 1/2016 | Maity | |
| 2016/0162280 A1 | 6/2016 | Murayama et al. | |
| 2017/0155573 A1 | 6/2017 | Khemani | |
| 2018/0102981 A1* | 4/2018 | Kurtzman | G06F 9/5022 |
| 2018/0113728 A1 | 4/2018 | Musani et al. | |
| 2018/0152341 A1 | 5/2018 | Maeda et al. | |
| 2018/0203739 A1* | 7/2018 | Brady | G06F 9/45558 |
| 2018/0232458 A1 | 8/2018 | Fitzgerald | |
| 2018/0267832 A1* | 9/2018 | Biener | G06F 9/5061 |
| 2019/0318039 A1 | 10/2019 | Nozhchev | |
| 2019/0391798 A1 | 12/2019 | Farrell | |
| 2020/0007629 A1 | 1/2020 | Tse et al. | |
| 2020/0076717 A1 | 3/2020 | Rantzau et al. | |
| 2020/0104113 A1 | 4/2020 | Grill et al. | |
| 2020/0156243 A1 | 5/2020 | Ghare et al. | |
| 2020/0311573 A1* | 10/2020 | Desai | H04L 67/10 |
| 2020/0403985 A1 | 12/2020 | Mahadevan | |
| 2021/0089325 A1 | 3/2021 | Suryanarayana | |
| 2022/0019561 A1 | 1/2022 | Jose | |
| 2022/0036224 A1 | 2/2022 | Sethi | |
| 2022/0345524 A1* | 10/2022 | Mitkar | G06F 16/128 |
| 2022/0383324 A1* | 12/2022 | Sheshadri | G06Q 10/0631 |
| 2023/0029888 A1* | 2/2023 | Wang | G06F 16/214 |
| 2023/0117047 A1 | 4/2023 | Francis | |
| 2023/0168929 A1* | 6/2023 | Wadekar | G06F 9/5005 718/104 |
| 2023/0236844 A1 | 7/2023 | Sethu | |
| 2023/0239195 A1 | 7/2023 | Mirgorodskiy et al. | |
| 2023/0350717 A1* | 11/2023 | Neate | G06F 9/5088 |
| 2024/0032081 A1* | 1/2024 | Sun | H04W 76/10 |
| 2024/0070050 A1 | 2/2024 | Pahwa | |
| 2024/0184682 A1 | 6/2024 | Vudathu | |

\* cited by examiner

METHOD TO AUTO CORRECT THE DEFAULT RESOURCE ALLOCATION OF SERVICES IN A MIGRATION ENVIRONMENT

BACKGROUND

As people increasingly rely on computing systems and devices to perform many tasks; the systems have become increasingly complex, and the opportunities for failure and/or loss of important data has also increased. Increasingly data and IT needs are being met by migrating services and data to external servers, storage, and service providers such as what is called the "cloud." However, the cloud environment frequently has different levels of provisioning, which have different capabilities and prices. Managing which level of provisioning a particular service receives is needed to efficiently utilize cloud-based storage.

SUMMARY

In general, certain embodiments described herein relate to a method for configuring resources in a cloud environment. A request is received from a user requesting that a migration of one or more services to a cloud environment begins. Once the request is received, the method determines a default resource provisioning of the cloud environment. The one or more services are analyzed to determine their current resource usage. Based on their current usage, the method forecasts future resource requirements of the one or more services. The method then compares the forecasted future resource requirements with that of the default resource provisioning of the cloud environment, and when the comparison is greater than a predetermined threshold, a new level of resource provisioning is recommended. The cloud environment is then changed to provide the new level of resource provisioning, and the one or more services are migrated to the cloud environment with the new level of resource provisioning.

In general, certain embodiments described herein relate to a non-transitory computer readable medium comprising of computer readable program code, which, when executed by a computer processor, enables the computer processor to perform a method for configuring resources in a cloud environment. The method begins by receiving a request from a user requesting that a migration of one or more services to a cloud environment begins. Once the request is received, the method determines a default resource provisioning of the cloud environment. The one or more services are analyzed to determine their current resource usage. Based on their current usage, the method forecasts future resource requirements of the one or more services. The method then compares the forecasted future resource requirements with that of the default resource provisioning of the cloud environment, and when the comparison is less than a predetermined threshold, but also greater than the default resource provisioning requirements, a new level of resource provisioning is recommended. The cloud environment is then changed to provide the new level of resource provisioning, and the one or more services are migrated to the cloud environment with the new level of resource provisioning.

In general, certain embodiments described herein relate to a system comprising: a cloud environment and a local computational device. The local computational device comprises a processor and a memory. The memory includes instructions, which when executed by the processor, performs a method for configuring resources in a cloud environment. The method begins by receiving a request from a user requesting that a migration of one or more services to a cloud environment begins. Once the request is received, the method determines a default resource provisioning of the cloud environment. The one or more services are analyzed to determine their current resource usage. Based on their current usage, the method forecasts future resource requirements of the one or more services. The method then compares the forecasted future resource requirements with that of the default resource provisioning of the cloud environment, and when the comparison is greater than a predetermined threshold, a new level of resource provisioning is recommended. The cloud environment is then changed to provide the new level of resource provisioning, and the one or more services are migrated to the cloud environment with the new level of resource provisioning.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
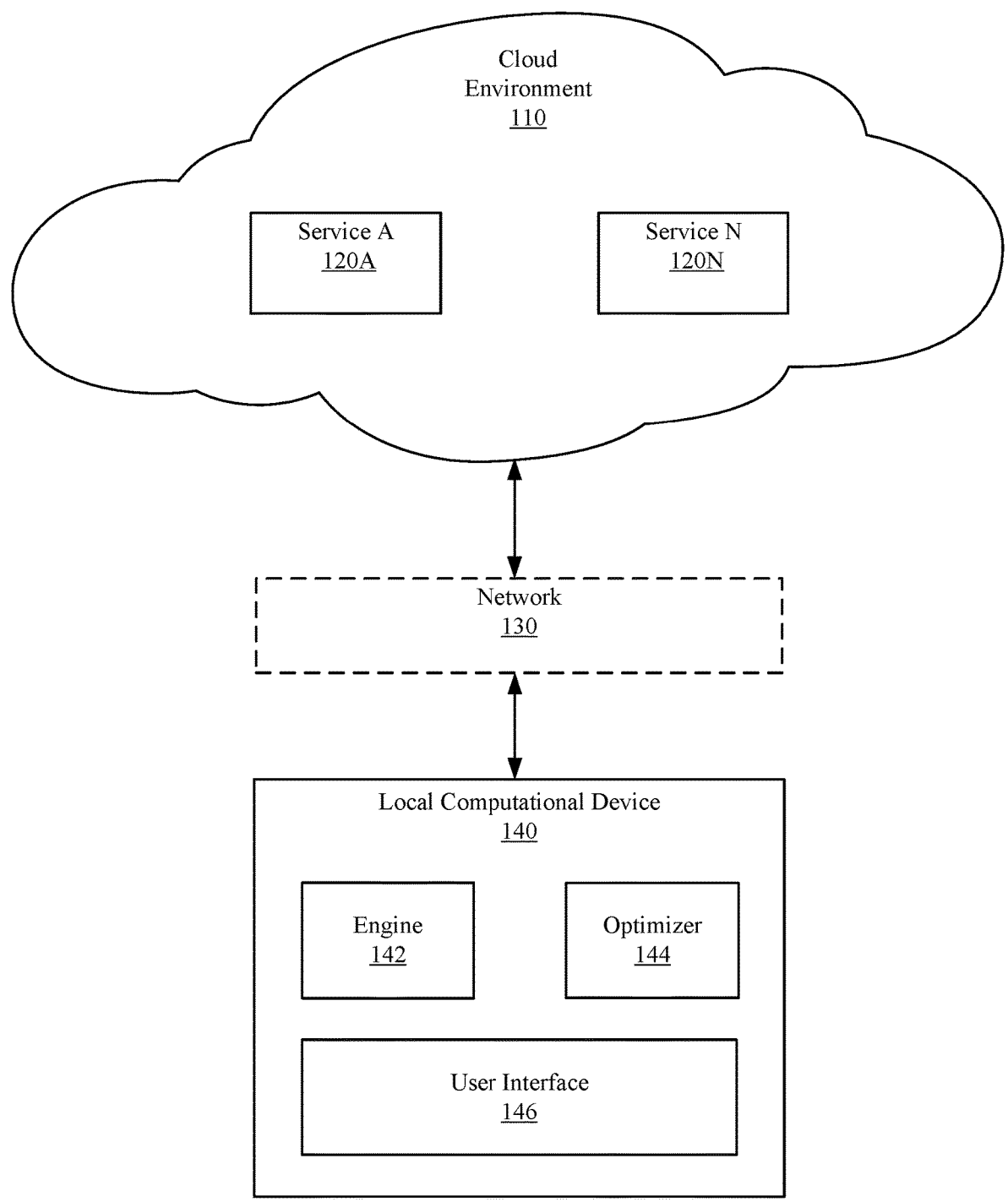
FIG. 1A shows a diagram of a system in accordance with one or more embodiments of the invention.

Specific embodiments will now be described with reference to the accompanying figures.

In the following description of the figures, any component described with regards to a figure, in various embodiments of the invention, may be equivalent to one or more like-named components described with regards to any other figure. For brevity, descriptions of these components will not be repeated with regards to each figure. Thus, every embodiment of the components of each figure is incorporated by reference and assumed to be optionally present within every figure having one or more like-named components. Additionally, in accordance with various embodiments of the invention, any description of the components of a figure is to be interpreted as an optional embodiment, which may be implemented in addition to, in conjunction with, or in place of the embodiments described with regards to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements.

The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase "operatively connected," or "operative connection," means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

Cloud environments provide an efficient way to host one or more services, without the customer needing to invest in expensive data center and maintenance costs. However, cloud environments are not without their own costs. The providers of cloud environment generally charge fees based on the amount of resources used to host services. Further, the data centers that host cloud environments have significant environmental costs due to their use of electricity and extensive cooling systems. The one or more embodiments of the invention seek to reduce the costs, both financially and environmentally, while maintaining a sufficient level of quality of service (QOS).

Frequently, cloud environment providers provide various levels of service based on service level agreement (SLAs). Each SLA tier/level/type generally has different costs as well various levels of quality of service (QOS). Based on the SLA and QoS, a particular tier storing data and/or providing one or more services may have various levels of availability (up-time, outages), reliability (guaranteed rate of successful response and minimum time between failures), performance (response time and deliver time guarantees), scalability (capacity fluctuations). Further, certain tiers of service may have, for example, more availability but less scalability; while other tiers of services may have various levels of QoS.

With distinct levels of QoS, the cloud environment providers generally charge different rates. The provider may charge fees for the amount of data stored in the cloud based environment, the amount of out-bound and or in-bound traffic between the cloud environment and local host as well as the Internet, and the amount of other services or use of components provided. Depending on the tier that a service or its data is assigned to, these fees may be more or less. It is desirable to place a service and/or its data in the lowest cost tier that provides the appropriate amount of service and availability; however, because moving a service and/or its data between the various tiers and/or other cloud environment providers may result in additional costs (due to fees on network traffic), it is desirable to initially place the service and/or its data in an optimized tier so that the service and/or data moves back and forth as little as possible. Therefore, there is an incentive to place a particular service in a higher tier then may be necessary.

Generally, when a service is migrated to a cloud environment (or other environment), a user or administrator manually configures the service and any related services or data. The user or administrator may have limited knowledge of the service's needs/usage, and may not be aware of other services that use the service being migrated. Also in a cloud environment, more than one service might be working together to serve the requests that reach the services. Among these distributed services, some of the services are crucial/common and are used in many customer work flows. For many of these services the default configuration is sufficient; however, for other services, the default either under-provisions or over-provisions resources for the service.

In a worst-case scenario, because the user and/or administrator utilizes a default configuration or even a best guess of what is needed for the service being migrated, the service may at some point no longer function due to under provisioning. For example, in a non-limiting example, if the default service level provides 2 GB of memory and a week later the migrated service requires 3 GB of memory, the migrated service may no longer function correctly or may completely fail. Because the services are inter-related, this may result in other services unexpectedly failing even when the migrating service does not fail. Due to the interdependencies for the various services, this might result in downtime; even for those services that are properly provisioned.

To overcome this, in one or more embodiments of the invention, an engine and an optimizer work together to determine optimal settings when one or more services are migrated to a particular cloud environment either from a local information handling system, or another cloud and/or edge environment. In the one or more embodiments of the invention, when a service is being migrated to a cloud environment (or another cloud environment, such as but not limited to a different provider), the engine determines the resource's allocation and consumption for the given service, as well as those resources that are needed for services that are dependent on the parent service being migrated and/or those services the service being migrated is dependent on.

In one or more embodiments of the invention, the engine analyzes the service to be migrated, as well as other resources such as configuration files and documentation. If the service is currently hosted on another cloud environment or has another instance on a cloud environment, the engine may use a cloud monitoring solution to determine how the service is used and functions. The engine sends this information to the optimizer, which determines a recommended configuration for the service being migrated. The optimizer, in one or more embodiments of the invention, may also determine recommended reconfigurations for other services that utilize and/or are being utilized by the migrated service. The optimizer, in one embodiment of the invention, uses multiple linear regression to determine the value of the target variable (memory etc.) with the input as other factors. For example, in a non-limiting example, to determine memory value, the factors that are considered are: CPU usage per instance, network traffic per instance, etc. This process is repeated for each resource parameter (memory, available processor usage, network configuration, etc.), and a recommended value for each resource parameter is determined.

The one or more embodiments of the invention described above may improve the efficiency of using a cloud-based environment for hosting one or more services. By forecasting the future needs of the one or more services, and adjusting the provisioning of the cloud-based environment, the one or more services may be provided in a reliable as well as cost effective manner. Using linear regression and/or machine learning to make determinations of the needed level of provisioning, choices may be made with more accuracy and timeliness than that of the trial and error of past methods.

The following describes various embodiments of the invention.

FIG. 1A shows a diagram of a cloud-based file-system in accordance with one or more embodiments of the invention. The system includes a cloud environment (e.g., 110) and a local computational device (140) connected by a network (130). The cloud environment (e.g., 110) hosts one or more services (e.g., 120A-120N). The cloud environment (e.g., 110) may also host data associated with the one or more services and or serve as a storage environment for other data and/or services. Each component may be operably connected by a network (130) to any of the other component. The network (130) and/or connections that connect each component may be any combination of wired and/or wireless connections. Each component illustrated in FIG. 1A is discussed below.

In one or more embodiments of the invention, the system includes one or more local computation devices (e.g., 120). While only one local computational device (e.g., 140) is shown, the local computational device (e.g., 140) may be part of a group that may include a plurality of production hosts, personal computers, smart phones, etc. without departing from the invention. The one or more local computation devices (e.g., 140) may comprise any number of computational devices, for example it may comprise of three production hosts, at least sixteen production hosts, at least fifty production hosts, or at least a hundred production hosts, or similar amount of other computation devices without departing from the invention.

In one or more embodiments of the invention, the local computational device (140), may take the form of production host which performs workloads and provides services to clients and/or other entities not shown in the system illustrated in FIG. 1A. The local computational device (e.g., 140) may further include the functionality to perform computer implemented services for users (e.g., clients). The computer implemented services may include, for example, database services, electronic mail services, data processing services, etc. The computer implemented services may include other and/or additional types of services without departing from the invention.

During the performance of the aforementioned services, data may be generated and/or otherwise obtained. The local computational device (e.g., 140) may store the data as local data or in storage hosted in the cloud environment (e.g., 110). Performing data storage services may include storing, modifying, obtaining, and/or deleting data. The data storage services may include other and/or additional services without departing from the invention.

Figure 3:
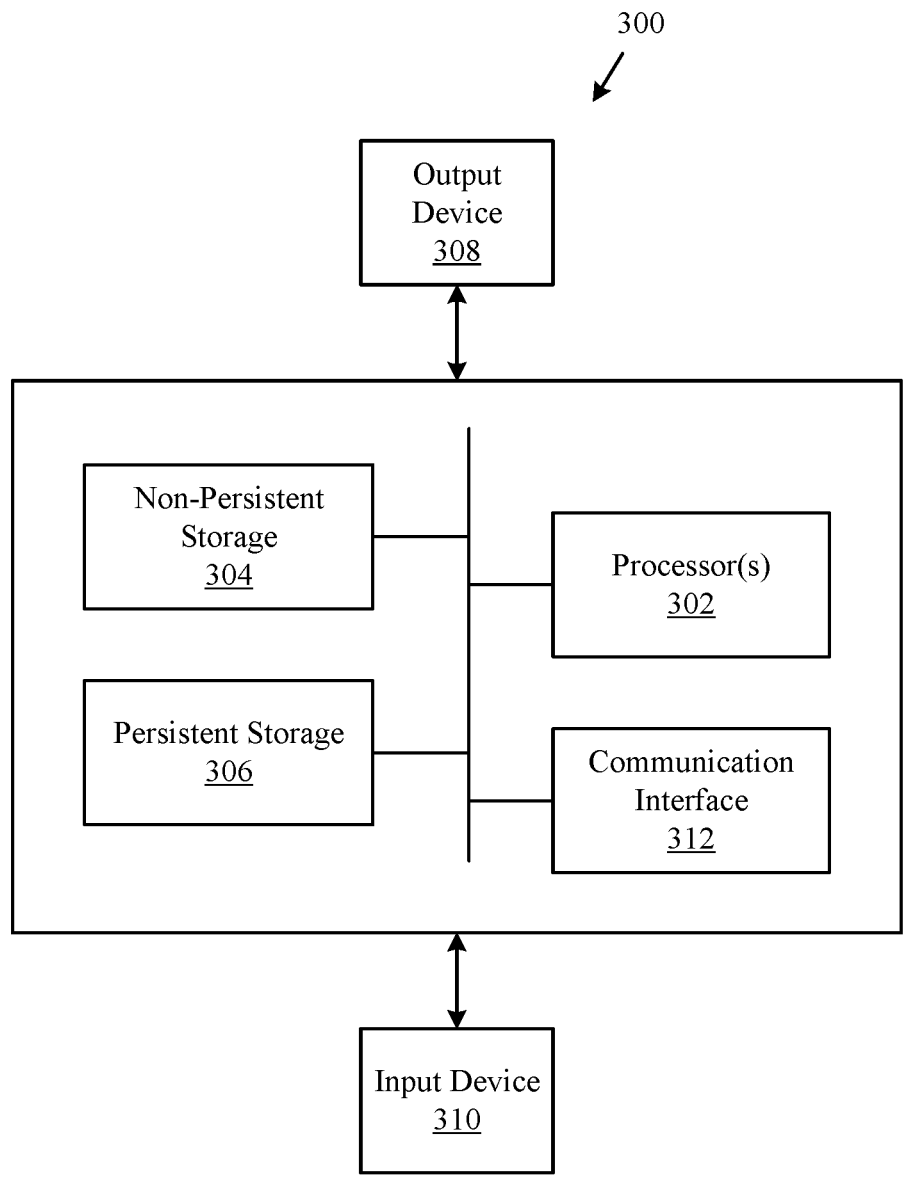
FIG. 3 shows a diagram of a computing device in accordance with one or more embodiments of the invention.

In one or more embodiments of the invention, the local computational device (e.g., 140) is implemented as a computing devices (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the local computational device (e.g., 140) described throughout this application.

In one or more embodiments of the invention, the local computational device (e.g., 140) is implemented as a logical device. The logical device may utilize the computing resources of any number of computing devices and thereby provide the functionality of the local computational device (e.g., 140) and/or production host described throughout this application.

The local computational device (e.g., 140) as well as other related components of the system perform one or more services (e.g., 120A-120N). The services may include storing, modifying, obtaining, and/or deleting data stored on both local computational device (e.g., 140) and the cloud storage (e.g., 110). The one or more services may take the form of web services, database services, games, entertainment services, HR services, etc. The services (e.g., 120A-120N) may at least initially reside on only one computational device (e.g., 140), or across a plurality of local computational devices (e.g., 140). The computational devices (e.g., 140) initially hosting the one or more services (e.g., 120A-120N) may be located in the same geographical location or across a plurality of geographical locations. Once the migration takes place, all of the services (e.g., 120A-120N) may be relocated to the cloud environment (110), or only some may be relocated. The services may include other and/or additional services without departing from the invention.

The local computational device (e.g., 140) may include storage devices (not shown) for storing data. The storage devices may be physical storage devices and/or logical storage devices. The physical storage devices may include any combination of hard disk drives, solid state disk drives, tape drives, and/or any other physical storage mediums for the storage of data. The logical storage devices (e.g., virtualized storage) may utilize any quantity of hardware storage resources of any number of computing devices for storing data. For example, the local may utilize portions of any combination of hard disk drives, solid state disk drives, tape drives, and/or any other physical storage medium of any number of computing devices.

The local computational device (e.g., 140) includes at least an engine (142), an optimizer (144), and a user interface (146). The local computational device (140) may also include processors, storage, communication interfaces, and other components as described in more detail with regards to FIG. 3. The engine (142) and optimizer (144) work together to implement the one or more embodiments of the invention, as will be described in more detail below with respect to the method shown in FIG. 2. The method produces a recommended provisioning, which is presented on the user interface (146) and/or implemented by the engine (142), optimizer (144), or other part of the local computation device (140).

The engine (142) analyzes the services (e.g., 120A-120N) being migrated to determine what resources a given service requires/uses. The specific resources are described in more detail below with respect to FIG. 1B. The engine (142), in one or more embodiments of the invention, determines this by accessing telemetry and/or logs that are associated with the specific service. From these accessed telemetry and/or logs, the engine may determine peak usage, as well as average usage. The engine may also determine which statics/events may predict that the service will fail to at least meet minimal service requirements.

Once the engine (142) determines the historical and average usage of the different resources, as well as any other pertinent information, the optimizer (e.g., 144) then analyzes this usage information to make one or more recommendations. As described in more detail with regards to the method shown in FIG. 2, the optimizer utilizes multiple linear regression and/or other forms of machine learning to determine a recommended value for each resource. For example, in a non-limiting example, if the engine finds that a service uses at most 1 GB of memory, on average 0.5 GB of memory, 10% of processor usage, the engine may determine that a proper provisioning is 1.5 GB of memory and 15% processor availability to allow for future growth. Other values and recommendations may be made without departing from the invention.

Once the optimizer (e.g., 144) determines a new level of resource provisioning for the cloud environment, in one or more embodiments of the invention, a user and/or administrator is notified using the user interface (146). The user interface (146) may take the form of a graphical user interface (GUI), a display, a printer, and/or any other well-known means of notifying a user/administrator of the suggested new level of resource provisioning. In one or more embodiments of the invention, the user may then implement the new level or resource provisioning and migrate the service to the cloud environment. In one or more other embodiments the cloud environment automatically implements the new level of resource provisioning.

The local computational device (140) may additionally be connected through a network (e.g., 130) such as the Internet, to one or more cloud environments (e.g., 110). The cloud environment (110) may be public or private (such as an internal or corporate cloud run by the owner of the local computational device (e.g., 140)).

In one or more embodiments of the invention, the network (e.g., 130) allows the local computational device (140) to communicate with the cloud environment (e.g., 110) as well as other hosts, systems, and/or clients (not shown). The various components of the local computational device (140) may also communicate with each other through a network (e.g., 130). The network (e.g., 130) may be a high-speed internal network and/or include part of an external network.

A network (e.g., 130) may refer to an entire network, or any portion thereof (e.g., a logical portion of the devices within a topology of devices). A network (e.g., 130) may include a data center network, a wide area network (WAN), a local area network (LAN), a wireless network, a cellular phone network, and/or any other suitable network that facilitates the exchange of information from one part of the network (e.g., 130) to another. A network (e.g., 130) may be located at a single physical location or be distributed at any number of physical sites. In one or more embodiments, the network (e.g., 130) may be coupled or overlap with, at least in part, the Internet.

In one or more embodiments, the network (e.g., 130) may include any number of devices within any of the components of the system. In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example: network chips, field programmable gate arrays (FPGAs), application specific integrated circuits (ASICs), indicator lights (not shown), fans (not shown), etc. A network device may include any other components without departing from the invention. Examples of a network device include, but are not limited to: a network switch, a router, a multilayer switch, a fibre channel device, an InfiniBand® device, etc. A network device is not limited to the aforementioned specific examples.

The network (e.g., 130) may connect the local computational device (e.g., 140) to a cloud environment (e.g., 110). The cloud environment (110) may be public or private (such as an internal or corporate cloud run by the owner of the local computational device (e.g., 140)). The cloud environment (110) may comprise of servers including host and internet-based storage. When the cloud environment (110) is not commonly owned by the owner of the local computational device (e.g., 140), the provider of the cloud environment (e.g., 140) provides different level of service and storage at different prices.

Frequently, cloud environment providers provide various tiers of service based on service level agreement (SLAs). Each SLA tier generally has different costs as well various levels of quality of service (QOS). Based on the SLA and QoS, a particular service (e.g., 120A) hosted by the cloud environment (110) may have various levels of availability (up-time, outages), reliability (guaranteed rate of successful response and minimum time between failures), performance (response time and deliver time guarantees), scalability (capacity fluctuations) and amount of resources provisioned. Different tiers of service may have, for example, more availability but less scalability. Other tiers of services may have various levels of QoS.

Generally, the cloud environment (110) provides a default level of resources, for example, in a non-limiting example, the cloud environment (110) may provide 2 GB of memory per hosted service. If at some point the server needs more resources than the default amount, the resources may be auto scaled to provide the needed level of resources; however, this is done at an increased cost (both financially as well as environmentally given the additional energy needed to provide the extra resources). In one or more embodiments of the invention, the SLA may only provide some or no auto scaling when the service needs more than the provisioned resources, and/or those provided by auto scaling the service may not function properly, at a desired quality of service, and/or fail all together.

With distinct levels of QoS, the cloud environment providers generally charge different rates. The cloud environment providers may charge a fee for such things as the amount of data stored in the cloud environment, the amount of out-bound and or in-bound traffic between the cloud environment and local computational devices, and the amount of other services or use of components provided. It is desirable to place a service or other asset in the appropriate tier/provisioning level; however, since retrieving or sending an asset has added cost (due to fees on network traffic), it is desirable to move the service back and forth as little as possible.

Figure 2:
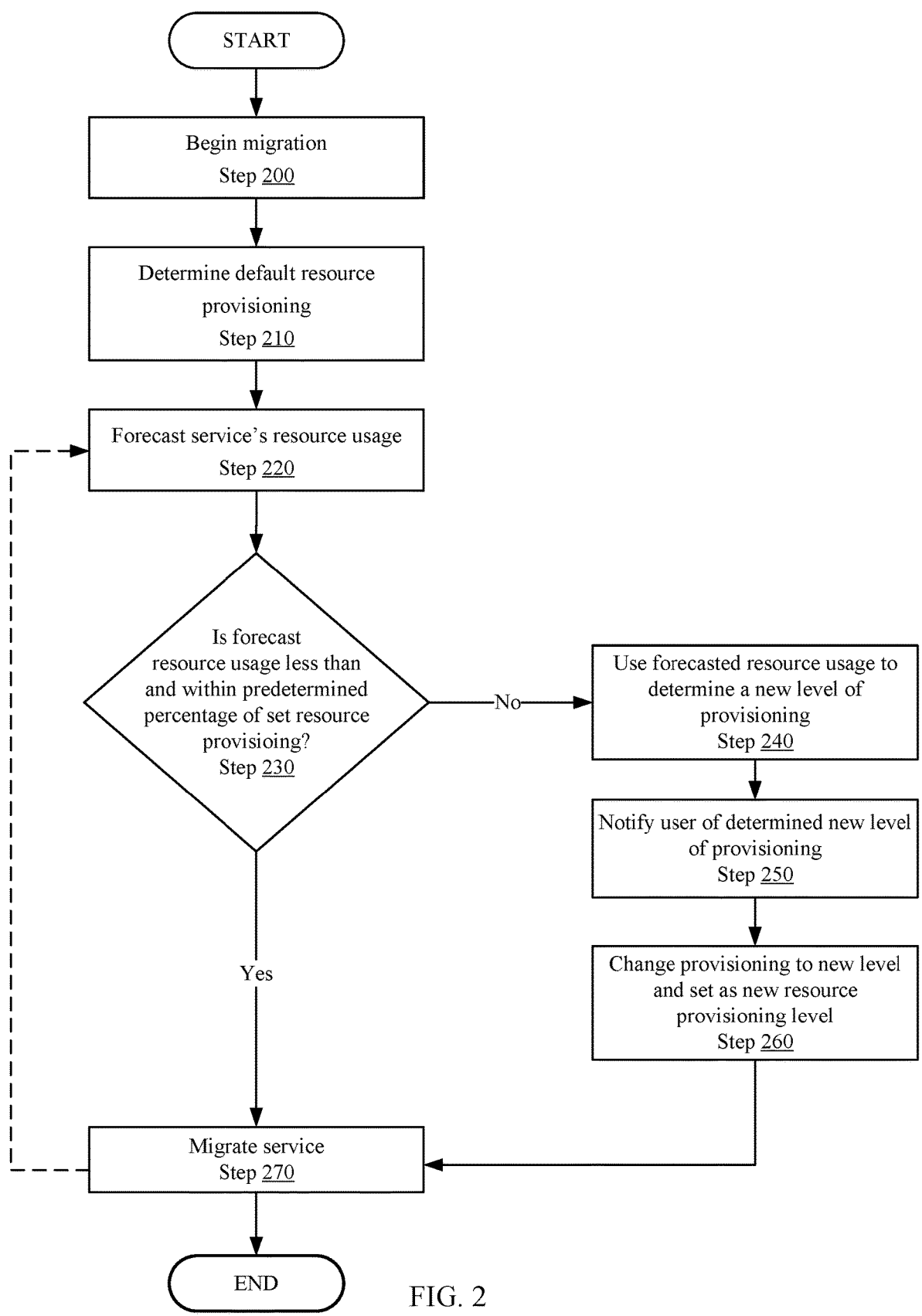
FIG. 2 shows a flowchart of a method for determining a new level of provisioning in accordance with one or more embodiments of the invention.

In one or more embodiments of the invention, as described in more detail with regards to the method shown in FIG. 2, when a service is initially being migrated to the cloud environment (e.g., 110), the local computation device (140) forecasts the amount of resources that will be potentially needed. Once the forecast is complete, in one or more embodiments of the invention, the cloud environment is configured to provide the optimized amount of provisioned resources for that service.

As will be described in more detail below with regards to the method shown in FIG. 2, when a user, administrator, or other concerned party or application wishes to migrate a service (e.g., 120A) to the cloud environment (e.g., 110) from a local computation device (e.g., 140), the cloud environment is configured with the forecasted provisioning, and the service (e.g., 120A) is migrated over the network (130) to the cloud environment (110). The service (e.g., 120A) may take the form of web services, database services, games, entertainment services, HR services, etc. The service (e.g., 120A) may at least initially reside on only one local computational device (e.g., 140), or across a plurality of local computational devices (e.g., 140). Alternatively, the service (e.g., 120A) may reside initially on one or more cloud environment (e.g., 110) and be migrated to a different cloud environment (e.g., 110).

Figure 1B:
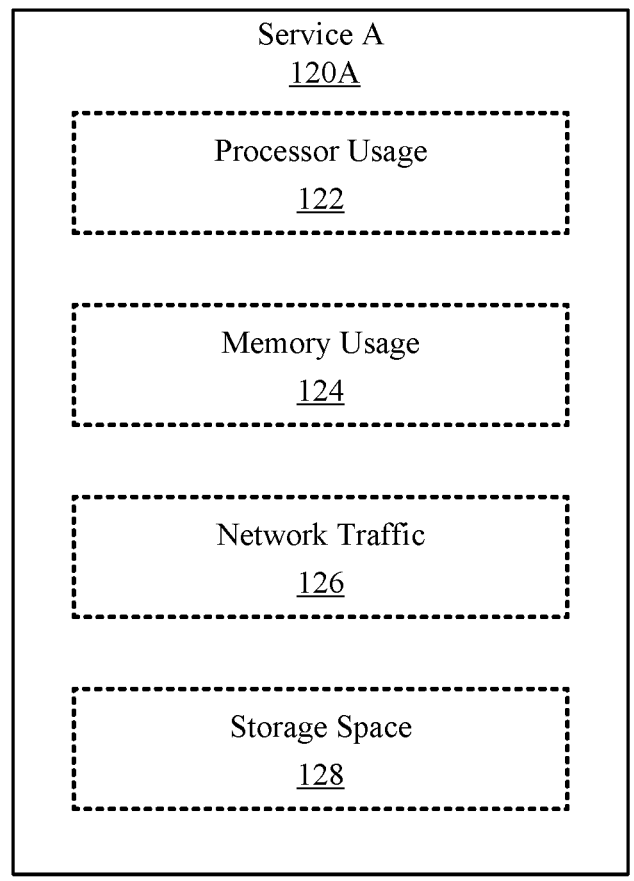
FIG. 1B shows a diagram of a service in accordance with one or more embodiments of the invention.

Turning now to FIG. 1B, in one or more embodiments of the invention, the engine (e.g., 142, FIG. 1A) monitors the service (e.g., 120A) and/or logs and telemetry associated with the service. The various resources used by the service and monitored by the engine may comprise of (but not limited to) processor usage (e.g., 122), memory usage (e.g., 124), network traffic (e.g., 126), and/or storage space (e.g., 128). Other resources used by a particular service (e.g., 120A) may be monitored without departing from the invention.

As described in more detail below with respect to the method shown in FIG. 2, each of these processes may be initially provisioned by the cloud environment (e.g., 110, FIG. 1A) at a default level, or prior to migrating the process, a new resource provisioning level may be determined and implemented. Periodically, the historic and forecast usage may be revised and a new resource provisioning level may be determined. Further, more than one resource may be monitored and used in the calculating of the provision. For example, in a non-limiting example, in order to determine a provision level for memory, it may be found that CPU usage and network traffic are strong indicators of future memory needs. Other such relationships may be determined as specified by a user or administrator, or as determined by using machine learning and/or multiple linear regression.

FIG. 2 shows a method for migrating one or more services to a cloud environment and configuring the resources of that cloud environment in accordance with one or more embodiments of the invention. While the various steps in the method are presented and described sequentially, those skilled in the art will appreciate that some or all of the steps may be executed in different orders, may be combined, or omitted, and some or all of the steps may be executed in a parallel manner without departing from the scope of the invention. The method may be performed by, for example, the engine (e.g., 142, FIG. 1A), optimizer (e.g., 144, FIG. 1A), user interface (e.g., 146, FIG. 1A) and/or other parts of the local computational device (e.g., 140, FIG. 1A). Other components of the system illustrated in FIGS. 1A and 1B may perform all, or a portion of the method of FIG. 2 without departing from the invention.

In step 200, a request is received to begin a migration of one or more services (e.g., 120A-120N, FIG. 1A) from a local computational device (e.g., 140, FIG. 1A) to a cloud environment (e.g., 110, FIG. 1A). Alternatively, the request may be to migrate a service (e.g., 120A-120N, FIG. 1A) from a first cloud environment (e.g., 110, FIG. 1A) to a second cloud environment (e.g., 110, FIG. 1A). The request may come from a user, administrator, or other concerned party or may be based on a determination made by an automatic monitoring system that determines that the current location of the one or more services (e.g., 120A-120N, FIG. 1A) is no longer sufficient, and that a new cloud environment (e.g., 110, FIG. 1A) would better fit the needs of the organization that the service belongs to.

Once the request for the migration is received in step 200, the method proceeds to step 210, where the default resource provisioning of the new cloud environment (e.g., 110, FIG. 1A) is determined. This may be determined by analyzing one or more FAQs, a contract, knowledge base (KB) articles, documentation from the cloud environment's provider, or any other source. The default resource provisioning may be specified by a specific tier of service or by other means. For example, in a non-limiting example, the default resource provisioning may be for 2 GB of memory, and 6 kbit/s of network capacity per service. Other provisioning may be default, and other resources, such as processor time or capacity, may be specified without departing from the invention.

Once the default resource provisioning is determined in step 210 (or concurrently with it), the service, or services to be migrated have their resource usage forecasted in step 220. The engine (e.g., 142, FIG. 1A) analyzes the services (e.g., 120A-120N, FIG. 1A) being migrated to determine what resources a given service requires/uses. In one or more embodiments of the invention, this is determined by accessing telemetry and/or logs that are associated with the specific service. From these accessed telemetry and/or logs, various statics about the resources used by the service may be determined. The engine may determine peak usage, as well as average usage. The method may also determine which statics/events may predict that the service will fail to at least meet minimal service requirements.

The method may also determine specific events or times when the service uses more or less resources. For example, in a non-limiting example, it may be determined that once a year in a January, a particular HR service uses significantly more resources than in any other month of the year.

Once the method determines the historical and average usage of the different resources as well as any other pertinent information, the optimizer (e.g., 144, FIG. 1A) or other pertinent part analyzes this usage information to make one or more recommendations. The optimizer utilizes multiple linear regression and/or other forms of machine learning to determine a recommended value for each resource. For example, in a non-limiting example if the engine finds that a service uses at most 1 GB of memory, on average 0.5 GB of memory, 10% of processor usage, the engine may determine that a proper provisioning is 1 GB of memory and 15% processor availability to allow for future growth.

Multiple linear regression is a type of modeling for modelling the relationship between a scalar response and multiple explanatory variables. Multiple linear regression may be used to produce a predictive model to an observed data set of values with limited error. A basic model may be calculated using the following formula for making a model with multiple linear regression:

$$Y_i = B_0 + B_1 X_{i1} + B_2 X_{i2} + \ldots B_p X_{ip} + E_i.$$

Where Y is the ith observation of the dependent variable $X_{ij}$, $B_j$ are parameters to be estimated and $E_i$ is the distributed normal error.

In order to forecast the determined historical and current resource usage, the various resource values are inputted into the multiple linear regression to determine a predicted value for each resource. For example, in a non-limiting example, a memory value may be calculated by inputting processor usage (for example CPU usage) per instance and network traffic per instance. The resulting model forecasts the memory usage at various times. In one or more other embodiments of the invention, machine learning may be used to analyze the determined historical current resource usage to forecast future needs of the service. Other methods of forecasting may be used without departing from the invention.

Once the service's resource usage is forecasted in step 220, the method proceeds to step 230. In step 230 the forecasted resource usage is compared with the default resource provisioning or the previous resource provisioning of the cloud environment. If the forecasted resource usage is less than the default resource provisioning or previous resource provision and less than a predetermined percentage, the method proceeds to step 270. If, however, the difference is greater than the predetermined percentage, or the forecast predicts that more resources are needed than what is currently provisioned, the method proceeds to step 240. The predetermined percentage may be determined by a user or administrator and may be chosen as a percentage that provides a desired QoS without inefficiently using resources and money. Other methods of determining the predetermined percentage or when a new level of provisioning should be calculated may be used without departing from the invention.

If, in step 230, it is determined that the forecasted resource usage is greater than the default or previous resource provisioning, or that it is greater than a predetermined percentage (i.e., more resources are provisioned then what is reasonably needed), the method proceeds to step 240. In step 240, a new level of provisioning is determined using the forecasted results in step 220, or by using linear regression or machine learning to analyze additional data to determine a new level of provision. Based on the predetermined rules and the predetermined percentage set by a user, or administrator, or other party the forecasted resource usage is used to determine the new level of provisioning. For example, in a non-limiting example, if it is forecasted that 0.96 GB of memory will be used, and the predetermined percentage is 20%, 1.2 GB of memory may be provisioned in order to ensure that there is sufficient memory for the service to use without failing, but with acceptable waste from overprovisioning. Other methods and percentages may be used to determine the new level of provisioning in step 240 without departing from the invention.

Once the new level of provisioning is determined in step 240, the method proceeds to step 250, where, optionally, the user or administrator is notified of the determined new level of provisioning. Once the user or administrator is notified in step 250 the method proceeds to step 260 where the new level of provisioning is implements. This, in one or more embodiments of the invention may be done by the user, administrator, or other entity. Alternatively in one or more embodiments of the invention the provision is done by an automatic process. In one or more embodiments, where the specific recommended level of provisioning is not possible (for example due to the provisioning being provided in tiers), the user, administrator, and/or process may choose the appropriate nearest level of provisioning sufficient to efficiently provide adequate resources.

The method proceeds to step 270. Step 270 may occur after it is determined that the default provisioning or previous level of provisioning in step 230 is sufficient, or after the new level of provisioning is determined in step 260. In step 270 the one or more services are migrated from the local computational device to the cloud environment that has its provisioning set as determined in steps 230 or step 260.

The method may end following step 260. Alternatively in one or more embodiments of the invention, the method steps shown in steps 220-260 are periodically repeated so that as changes occur to the service over time, the provisioning may be appropriately adjusted. For example, in a non-limiting example, if the initial memory provisioning is 1 GB, but after an update to the service it is discovered that 2 GB is needed, then in accordance with one or more embodiments of the invention, when the steps 220-260 are repeated, it will be discovered that the provisioning should be changed to the new level of 2 GB, and the provisioning will be updated to 2 GB in step 260.

Additionally, as discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many distinct types of computing devices exist, and the input and output device(s) may take other forms.

One or more embodiments of the invention may be implemented using instructions executed by one or more processors of the data management device. Further, such instructions may correspond to computer readable instructions that are stored on one or more non-transitory computer readable mediums.

The one or more embodiments, of the invention described above may improve the efficiency of using a cloud-based environment for hosting one or more services. By forecasting the future needs of the one or more services and adjusting the provisioning of the cloud-based environment, the one or more services may be provided in a reliable as well as cost effective manner. Using linear regression and/or machine learning to make determinations of the needed level of provisioning, choices may be made with more accuracy and timeliness then that of the try and error of past methods.

The problems discussed above should be understood as being examples of problems solved by embodiments of the invention disclosed herein and the invention should not be limited to solving the same/similar problems. The disclosed invention is applicable to address a range of problems beyond those discussed herein.

While the invention has been described with respect to a limited number of embodiments, those skilled in the art, having benefit of this disclosure, will appreciate that other embodiments may be devised which do not depart from the scope of the technology as disclosed herein. Accordingly, the scope of the invention should be limited only by the attached claims.

What is claimed is:

1. A method for configuring resources in a cloud environment, the method comprising:
   receiving, from a user, a request to begin migration of one or more services to the cloud environment;
   determining, after receiving the request, a default resource provisioning of the cloud environment;
   analyzing, after receiving the request, the one or more services to determine their current resource usage;
   forecasting, based on the determined current resource usage of the one or more services, future resource requirements of the one or more services;
   comparing the forecasted future resource requirements of the one or more services with the default resource provisioning of the cloud environment, to determine a difference between the default resource provisioning and the forecasted future resource requirements;
   determining, when the difference is greater than a predetermined threshold, a new level of resource provisioning of the cloud environment;
   making a first determination that the new level of resource provisioning of the cloud environment is not possible to implement;
   notifying the user, based on the first determination, that the new level of resource provisioning of the cloud environment is not possible to implement;
   receiving an alternative level of resource provisioning of the cloud environment;
   changing the cloud environment to provide the alternative level of resource provisioning of the cloud environment; and
   migrating the one or more services to the cloud environment after changing the cloud environment;
   periodically monitoring, after migrating the one or more services to the cloud environment, a resource usage of the one or more services;
   making a second determination, based on the monitoring, that an update to the one or more services has occurred at a first time;
   comparing, based on the second determination, the monitored resource usage of the one or more services after the first time with the alternative level of resource provisioning, to determine a second difference between the alternative level of resource provisioning and the monitored resource usage;
   determining, when the second difference is greater than the predetermined threshold, a second new level of resource provisioning of the cloud environment; and
   changing the cloud environment to provide the second new level of resource provisioning.

2. The method of claim 1, wherein the changing the cloud environment to provide the alternative level of resource provisioning of the cloud environment is performed automatically.

3. The method of claim 1, wherein changing the cloud environment to provide the alternative level of resource provisioning of the cloud environment is performed manually by the user.

4. The method of claim 1, wherein the determining the new level of resource provisioning of the cloud environment is performed by using linear regression.

5. The method of claim 1, wherein the forecasting is performed using machine learning to determine the future resource requirements.

6. The method of claim 1, wherein the method further comprises:
   determining, when the second difference is less than the predetermined threshold and the monitored resource usage of the one or more services is greater than the alternative level of resource provisioning of the cloud environment, a third new level of resource provisioning of the cloud environment; and
   changing the cloud environment to provide the third new level of resource provisioning of the cloud environment.

7. A non-transitory computer readable medium comprising computer readable program code, which when executed by a computer processor enables the computer processor to perform a method for configuring resources in a cloud environment, the method comprising:
   receiving, from a user, a request to begin migration of one or more services to the cloud environment;
   determining, after receiving the request, a default resource provisioning of the cloud environment;
   analyzing, after receiving the request, the one or more services to determine its current resource usage;
   forecasting, based on the determined current resource usage of the one or more services, future resource requirements of the one or more services;
   comparing the forecasted future resource requirements of the one or more services with the default resource provisioning of the cloud environment, to determine a difference between the default resource provisioning and the forecasted future resource requirements;
   determining, when the difference is less than a predetermined threshold and that the forecasted future resource requirements are greater than the default resource provisioning requirements, a new level of resource provisioning of the cloud environment which is greater than the default resource provisioning of the cloud environment;
   making a first determination that the new level of resource provisioning of the cloud environment is not possible to implement;
   notifying the user, based on the first determination, that the new level of resource provisioning of the cloud environment is not possible to implement;
   receiving an alternative level of resource provisioning of the cloud environment;
   changing the cloud environment to provide the alternative level of resource provisioning of the cloud environment; and
   migrating the one or more services to the cloud environment after changing the cloud environment;
   periodically monitoring, after migrating the one or more services to the cloud environment, a resource usage of the one or more services;

making a second determination, based on the monitoring, that an update to the one or more services has occurred at a first time;

comparing, based on the second determination, the monitored resource usage of the one or more services after the first time with the alternative level of resource provisioning, to determine a second difference between the alternative level of resource provisioning and the monitored resource usage;

determining, when the second difference is greater than the predetermined threshold, a second new level of resource provisioning of the cloud environment; and changing the cloud environment to provide the second new level of resource provisioning.

8. The non-transitory computer readable medium of claim 7, wherein the changing the cloud environment to provide the alternative level of resource provisioning of the cloud environment is performed automatically.

9. The non-transitory computer readable medium of claim 7, wherein the determining the new level of resource provisioning of the cloud environment is performed by using linear regression.

10. The non-transitory computer readable medium of claim 7, wherein the forecasting is performed using machine learning to determine the future resource requirements.

11. The non-transitory computer readable medium of claim 7, wherein the method further comprises:

determining, when the second difference is less than the predetermined threshold and the monitored resource usage of the one or more services is greater than the alternative level of resource provisioning of the cloud environment, a third new level of resource provisioning of the cloud environment; and changing the cloud environment to provide the third new level of resource provisioning of the cloud environment.

12. A system comprising:
a cloud environment; and
a local computational device which comprises of:
   a processor; and
   a memory comprising instructions, which when executed by the processor, performs a method for configuring resources in the cloud environment, the method comprising:
      receiving, from a user, a request to begin migration of one or more services to the cloud environment;
      determining, after receiving the request, a default resource provisioning of the cloud environment;
      analyzing, after receiving the request, the one or more services to determine their current resource usage;
      forecasting, based on the determined current resource usage of the one or more services, future resource requirements of the one or more services;
      comparing the forecasted future resource requirements of the one or more services with the default resource provisioning of the cloud environment, to determine a difference between the default resource provisioning and the forecasted future resource requirements;
      determining, when the difference is greater than a predetermined threshold, a new level of resource provisioning of the cloud environment;
      making a first determination that the new level of resource provisioning of the cloud environment is not possible to implement;
      notifying the user, based on the first determination, that the new level of resource provisioning of the cloud environment is not possible to implement;
      receiving an alternative level of resource provisioning of the cloud environment;
      changing the cloud environment to provide the alternative level of resource provisioning of the cloud environment; and
      migrating the one or more services to the cloud environment after changing the cloud environment;
      periodically monitoring, after migrating the one or more services to the cloud environment, a resource usage of the one or more services;
      making a second determination, based on the monitoring, that an update to the one or more services has occurred at a first time;
      comparing, based on the second determination, the monitored resource usage of the one or more services after the first time with the alternative level of resource provisioning, to determine a second difference between the alternative level of resource provisioning and the monitored resource usage;
      determining, when the second difference is greater than the predetermined threshold, a second new level of resource provisioning of the cloud environment; and
      changing the cloud environment to provide the second new level of resource provisioning.

13. The system of claim 12, wherein the changing the cloud environment to provide the alternative level of resource provisioning of the cloud environment is performed automatically.

14. The system of claim 12, wherein changing the cloud environment to provide the alternative level of resource provisioning of the cloud environment is performed manually by the user.

15. The system of claim 12, wherein the determining the new level of resource provisioning of the cloud environment is performed by using linear regression.

* * * * *